(12) United States Patent
Yamazoe

(10) Patent No.: US 12,418,594 B2
(45) Date of Patent: Sep. 16, 2025

(54) NETWORK SYSTEM AND METHOD OF SWITCHING SERVERS

(71) Applicant: CANON KABUSHIKI KAISHA, Tokyo (JP)

(72) Inventor: Hisatoshi Yamazoe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 174 days.

(21) Appl. No.: 18/346,998

(22) Filed: Jul. 5, 2023

(65) Prior Publication Data
US 2024/0015227 A1    Jan. 11, 2024

(30) Foreign Application Priority Data
Jul. 6, 2022   (JP) .................................. 2022-109064

(51) Int. Cl.
*H04L 67/00*   (2022.01)

(52) U.S. Cl.
CPC .................................. *H04L 67/34* (2013.01)

(58) Field of Classification Search
None
See application file for complete search history.

(56) References Cited

U.S. PATENT DOCUMENTS

| | | | | |
|---|---|---|---|---|
| 2012/0170731 | A1* | 7/2012 | Smith | H04M 7/0057 379/142.05 |
| 2015/0149523 | A1* | 5/2015 | Nakamura | H04L 67/55 709/201 |
| 2017/0264704 | A1* | 9/2017 | Kikuchi | H04L 67/568 |
| 2021/0120139 | A1* | 4/2021 | Kobayashi | H04N 1/00244 |
| 2024/0089330 | A1* | 3/2024 | Wakamatsu | H04L 67/12 |

FOREIGN PATENT DOCUMENTS

JP   2013168180 A   8/2013

* cited by examiner

*Primary Examiner* — Brian J. Gillis
(74) *Attorney, Agent, or Firm* — Canon U.S.A., Inc. IP Division

(57) ABSTRACT

A device transmits operation information to a connected server. A second server transmits, to a first server, a request for first connection information for the device to connect to the first server based on reception of a registration request accompanying a firmware update from the device. The first server, after a reception of the request for the first connection information, starts transferring, to the second server, data related to the device, and transmits to the second server the first connection information in response to the request. The second server transmits to the device the first connection information received from the first server. When the transferring of the data related to the device reaches a predetermined step, second connection information for connecting to the second server is transmitted from either the first server or the second server to the device.

11 Claims, 10 Drawing Sheets

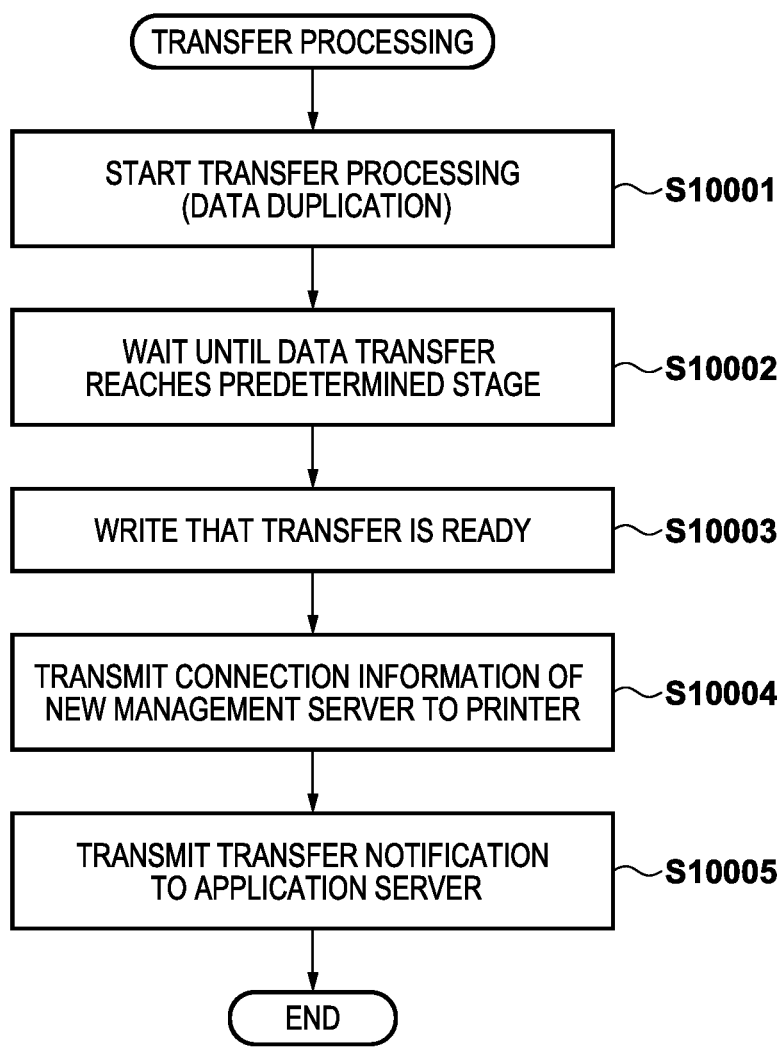

NETWORK SYSTEM AND METHOD OF SWITCHING SERVERS

BACKGROUND

Technical Field

One disclosed aspect of the embodiments relates to a network system to which a printer is connected via a network, the printer to which the connection is made is managed, and a job notification is performed by the network system, and to a method of switching servers.

Description of the Related Art

The development and spread of the "Internet of Things" (hereinafter referred to as IoT) and cloud services have made it easier than before to collect data from various "things" via the Internet. Image forming apparatuses have become multifunctional, and multifunction peripherals called multifunction printers (hereinafter, referred to as MFPs) are utilized as client apparatuses.

Recently, in view of protection of personal and confidential information, laws have been established to regulate the physical countries and geographical areas (hereafter referred to as regions) of client apparatuses that transmit data and servers that receive data. When attempting to connect to a server in a region different from regions of previous connections, a client apparatus takes measures, such as clearing connection settings, to prevent data from being leaked to the wrong region.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD®), or Blu-ray Disc®, a flash memory device, a memory card, and the like.

The disclosure described in Japanese Patent Laid-Open No. 2013-168180 eliminates the need for the client apparatus to be aware of the change of a transmission destination by a pre-change server and a post-change server exchanging data of the client apparatus when the servers are switched. After the servers have performed the above-mentioned processing, the client apparatus is notified of the change of the server transmission destination for the first time by receiving connection settings from the post-change server.

However, in the disclosure described in Japanese Patent Laid-Open No. 2013-168180, if the client apparatus connects to the pre-change server before connection settings for a connection destination change are received, an inconsistency will occur in client information transferred to the post-change server, resulting in cases where operation is not performed normally.

As a method of solving such a problem, a method of preventing inconsistencies by blocking connections from the client device during data transfer is conceivable. However, when, for example, the client apparatus is a printer, cloud services (e.g., a cloud printing service) provided via the server will cease to be available during data transfer.

SUMMARY

The disclosure allows client-related data transfer between servers, regardless of a state of a client apparatus and while services are continuously provided to the client apparatus during data transfer. In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or program that, when executed by the CPU, cause the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials. Furthermore, depending on the context, the term "portion," "part," "device," "switch," or similar terms may refer to a circuit or a group of circuits. The circuit or group of circuits may include electronic, mechanical, or optical elements such as capacitors, diodes, transistors. For example, a switch is a circuit that turns on and turns off a connection. It can be implemented by a transistor circuit or similar electronic devices.

In order to solve the above-described problems, the disclosure includes the following configurations. According to one aspect of the disclosure, a network system includes a device, a first server, and a second server. The device transmits operation information to a connected server. The second server includes at least one second processor. At least one second program executed by the at least one second processor causes the second server to transmit, to the first server, a request for first connection information for the device to connect to the first server based on reception of a registration request accompanying a firmware update from the device. The first server includes at least one first processor. At least one first program executed by the at least one first processor causes the first server to, after a reception of the request for the first connection information, start transferring, to the second server, data related to the device, and transmit to the second server the first connection information in response to the request for the first connection information. The at least one second program causes the second server to further transmit to the device the first connection information received from the first server. When the transferring of the data related to the device reaches a predetermined step, second connection information for connecting to the second server is transmitted from either the first server or the second server to the device.

By virtue of the disclosure, it is possible to perform client-related data transfer between servers, regardless of the state of a client apparatus and while services are continuously provided to the client apparatus during data transfer.

Further features of the disclosure will become apparent from the following description of exemplary embodiments with reference to the attached drawings.

BRIEF DESCRIPTION OF THE DRAWINGS

FIG. 10 is a flowchart of processing of the management server 300 after it has received a registration request.

DESCRIPTION OF THE EMBODIMENTS

Figure 1:
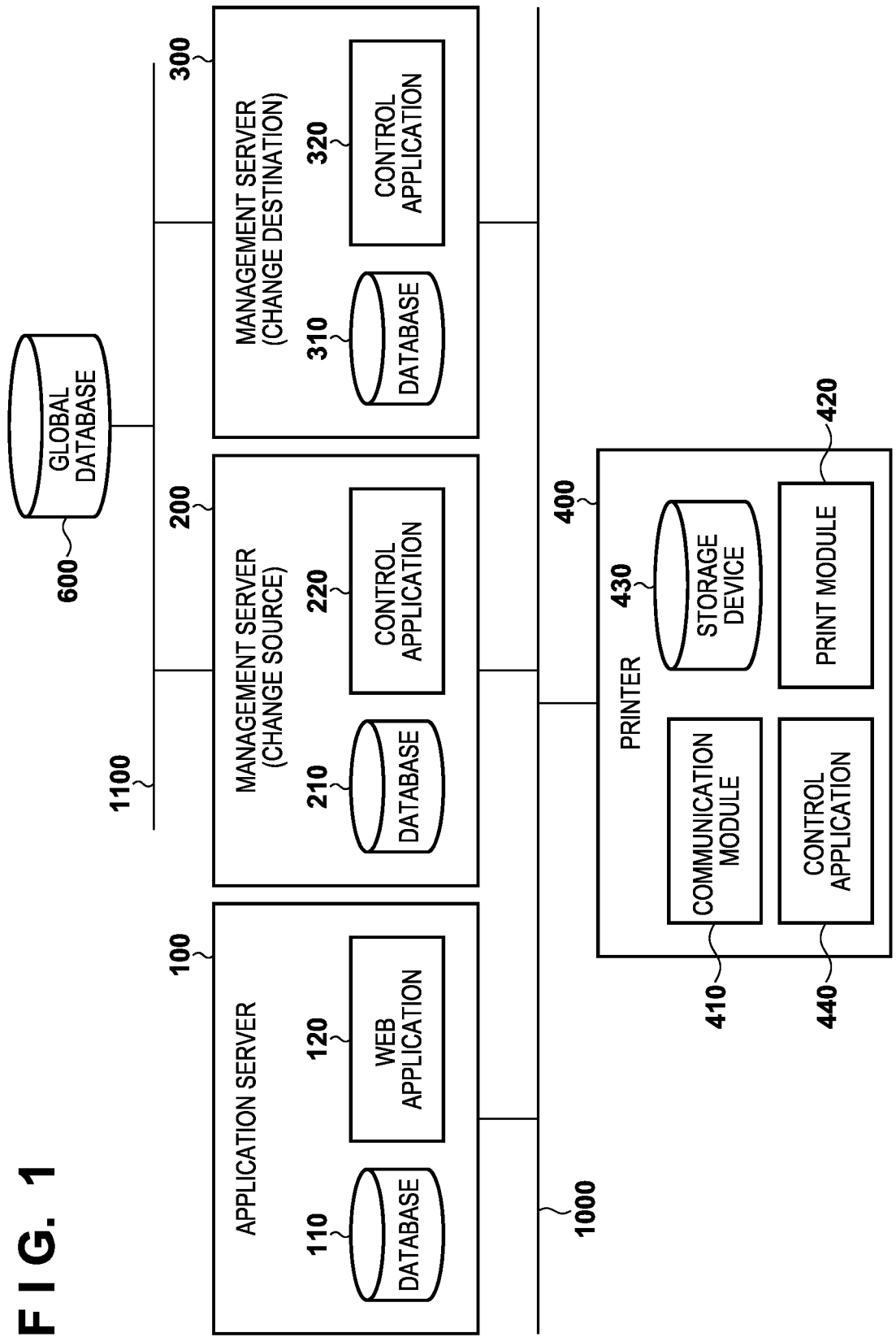
FIG. 1 is a diagram illustrating an example of a configuration of a client-server type network system according to a first embodiment.

Hereinafter, embodiments will be described in detail with reference to the attached drawings. Note, the following embodiments are not intended to limit the scope of the disclosure. Multiple features are described in the embodiments, but limitation is not made to an embodiment that requires all such features, and multiple such features may be combined as appropriate. Furthermore, in the attached drawings, the same reference numerals are given to the same or similar configurations, and redundant description thereof is omitted.

First Embodiment

In the present embodiment, a cloud printing service (or a cloud printing system) will be described. In the present cloud printing service, a printer, an application server, and a management server work together to notify the printer of job data, which has been generated by the management server upon receipt of a print request from a web application running on the application server, and perform printing. A description will be given for an example in which in the cloud printing service, a printer that does not have a server switching function obtains the server switching function by a firmware update and switches over the management server to which it connects, triggered by the firmware update. The firmware update may also be called a Read Only Memory (ROM) update. The printer belonging to the cloud printing system may also be referred to, more generally, as a device.

A management server that manages the printer belonging to the cloud printing service is one of the management servers that are present in each country or geographical area and is predetermined. The management server is determined by a shipping destination of the printer, information on the country or geographical area in which the printer is installed, a service usage status of a user, and the like to prevent printer-specific information and personal information of the user from being leaked to foreign countries and to optimize communication time. The server switching function is a function for, when a management server determined in advance for the printer is changed to another management server, transferring the printer registered in a pre-change management server to a post-change management server. The change of the management server here does not include a device update and the like and includes a change from a management server in which the printer has been registered to another management server. That is, a server switch refers to a change of a destination server that the printer accesses at the time of cloud printing.

System Configuration

FIG. 1 is a diagram illustrating an overall configuration of a data transmission system according to the present embodiment. First, a configuration of a system in which an application server 100, management servers 200 and 300, a printer 400, and a global database 600 are linked will be described. A network 1000 is a network that connects the application server 100, the management servers 200 and 300, and the printer 400 to each other. The network 1000 may be, for example, the Internet, and is a communication network realized by a local area network (hereinafter, abbreviated as LAN), a wide area network (hereinafter, abbreviated as WAN), or the like. The network 1000 may further include wired communications, such as a telephone line, a dedicated digital line, an ATM and frame relay line, and a cable TV line, and wireless communications, such as a wireless line for data broadcasting. The network 1000 may be of any type so long as it enables exchange of data between the respective elements. In the present embodiment, a description will be given assuming that the network 1000 is the Internet.

A network 1100 is a network that connects the management servers 200 and 300 and the global database 600 to each other. The network 1100 may be, for example, the Internet, and is a communication network realized by a LAN, a WAN, a telephone line, a dedicated digital line, an ATM and frame relay line, a cable TV line, a wireless line for data broadcasting, and the like. The network 1100 may be of any type so long as it enables exchange of data between the respective elements. In the present embodiment, a description will be given assuming that the network 1100 is the Internet.

A database 110 of the application server 100 stores various kinds of information for providing the cloud printing service to the user. A web application 120 transmits a print request to the management server 200 or 300 via the network 1000 and receives operation information of the printer 400 from the management server 200 or 300.

Databases 210 and 310 of the management servers 200 and 300 store client information for the printer 400 to establish a connection and print job information of the printer 400. Control applications 220 and 320 generate job data based on a print request received from the application server 100 and transmit the job data to the printer 400 via the network 1000. The control applications 220 and 320 also transmit a job notification to the printer 400 via the network 1000. In the present embodiment, the management server 200 and the management server 300 belong to regions that are different from each other and, for example, manage printers that are in their respective regions and provide job data, which is data to be printed, to the printer.

A communication module 410 of the printer 400 receives a job notification by communicating with a management server in which the printer 400 is registered between the management server 200 and the management server 300 via the network 1000. Furthermore, the printer 400 receives job data from the management server 200 or 300 via the network 1000 using job data connection information included in the job notification. A storage device 430 stores job data. A print module 420 prints job data received and stored by the communication module 410 by processing the job data.

The global database 600 is connected to the management server 200 and the management server 300 via the network 1100 and manages registration of information shared between the management servers. In FIG. 1, each element is illustrated in a single-unit configuration for the sake of descriptive simplicity in the present embodiment; however, there is no intention to limit the number of components of the elements in the configuration. Each element may be constituted by one or more components.

The management server 200 may be referred to as a first server, and the management server 300 may be referred to as a second server. The data transmission system of FIG. 1 may be referred to as a network system or a cloud printing system.

Hardware Configuration of Each Apparatus

Figure 2:
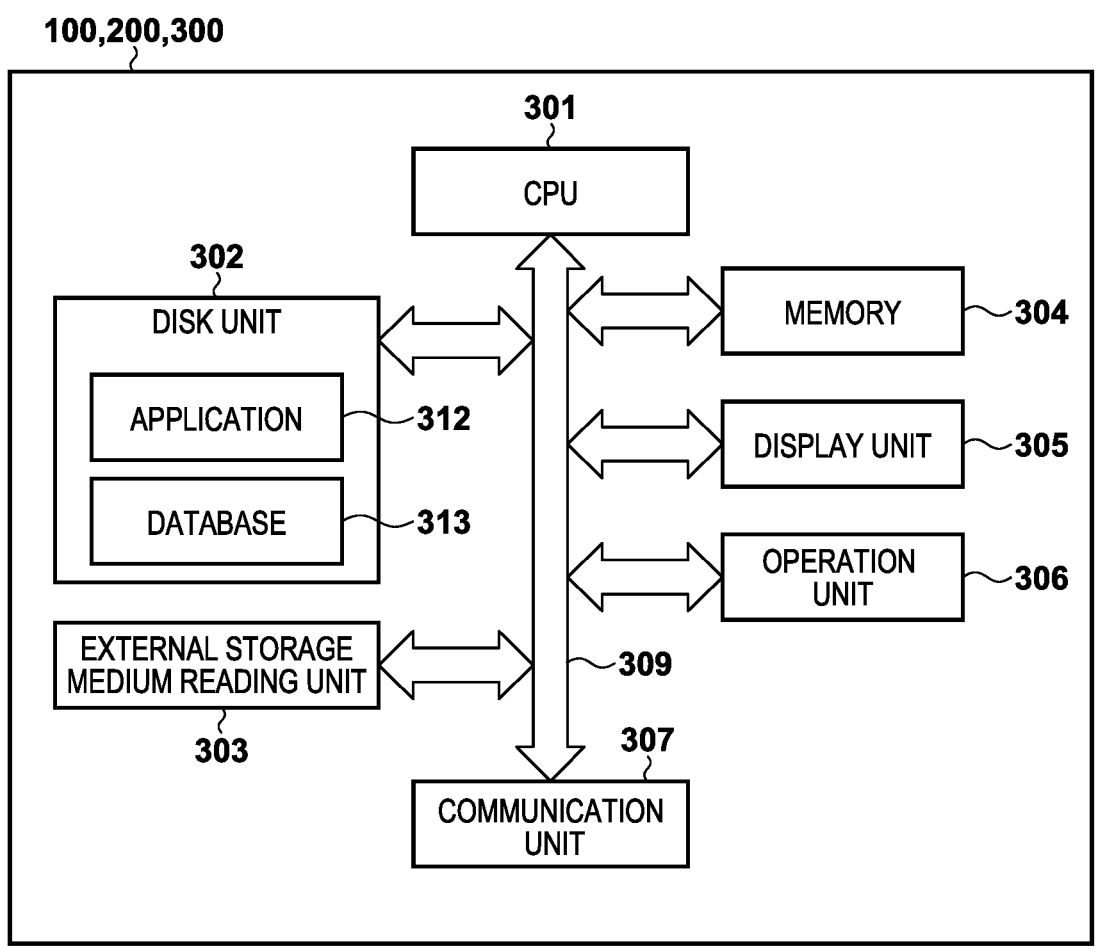
FIG. 2 is a diagram illustrating a configuration of an application server 100 and management servers 200 and 300.

FIG. 2 is a block diagram illustrating a schematic configuration of the application server 100 and the management servers 200 and 300. A Central Processing Unit (CPU) 301 is a circuit or device for controlling each of the following units. A disk unit or circuit 302 stores an application program 312, a database 313, an Operating System (OS), and various other files to be read out by the CPU 301. An external storage medium reading unit or circuit 303 is an apparatus for reading out information, such as a file stored in an external storage medium such as a Secure Digital (SD) card. A memory 304 is configured by a Random Access Memory (RAM) or the like, and the CPU 301 temporarily stores and buffers data and the like as necessary. A display unit or circuit 305 is configured by, for example, a Liquid Crystal Display (LCD), and displays various kinds of information. An operation unit or circuit 306 includes a keyboard, a mouse, and the like for the user to perform various kinds of input operations. A network communication unit or circuit 307 is connected to a network, such as the Internet, and performs various kinds of communication. The communication unit or circuit 307 supports a wired LAN and a wireless LAN. Each of the above-described units or circuits is connected to each other by a bus 309. The web application 120 of the web application server 100, the control application 220 of the management server 200, and the control application 320 of the management server 300, which will be described later, are realized by the CPU 301 reading and executing a program necessary for processing.

Figure 3:
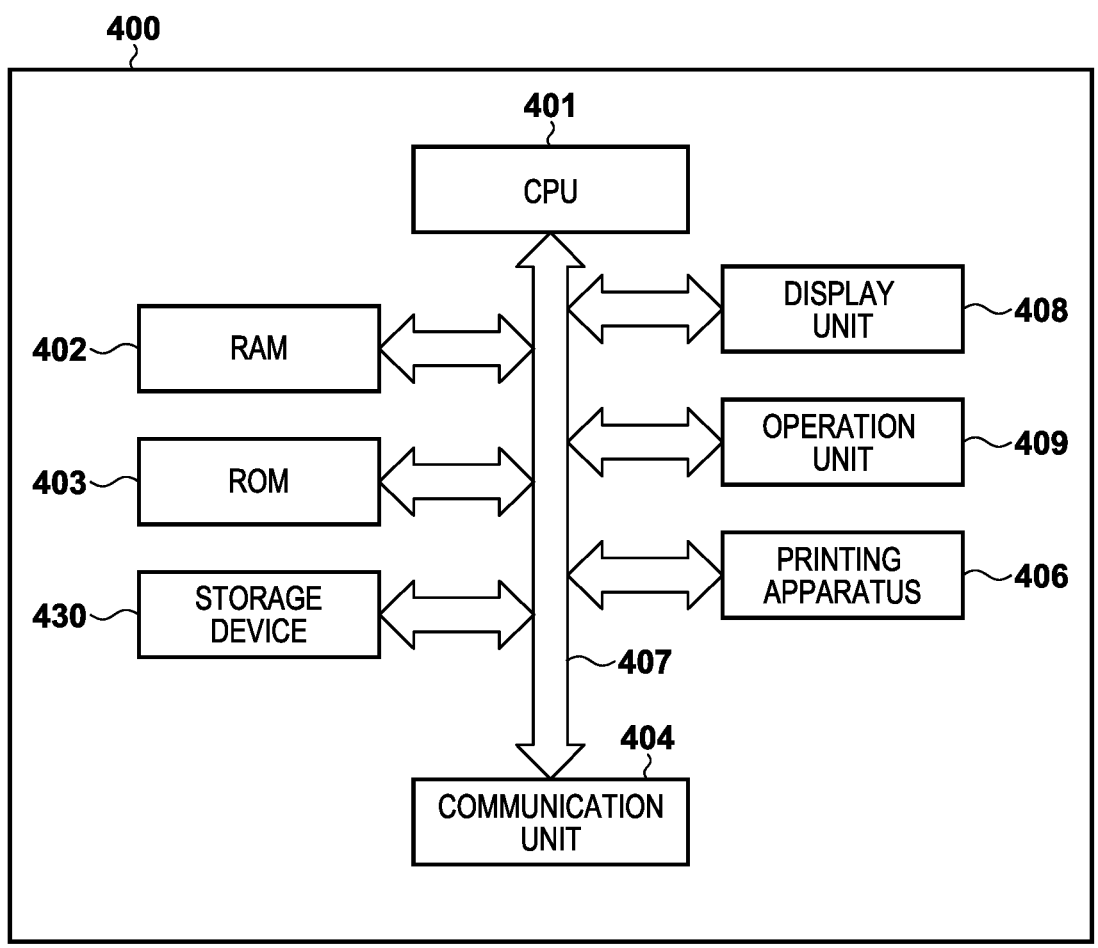
FIG. 3 is a diagram illustrating a configuration of a printer 400.

FIG. 3 is a diagram illustrating a configuration of the printer 400. A CPU 401 performs computation, determination, and control of data/instructions according to a program stored in a RAM 402 or a ROM 403. The RAM 402 is used as temporary storage region for when the CPU 401 performs various kinds of processing. The ROM 403 stores an OS and other application software. In the present embodiment, the ROM 403 is a data-rewritable non-volatile memory typified by a flash memory. A communication unit 404 is an interface to which a LAN cable is connected, and data communication with each of the application server 100, the management server 200, and the management server 300 is performed via a router (not illustrated) or the network 1000. The data communication may be performed wirelessly, for example, by an interface that supports wireless communication.

A display unit 408 is configured by, for example, an LCD, and displays various kinds of information. An operation unit 409 includes a button, a touch panel, and the like for the user to perform various kinds of input operations. A printing apparatus 406 processes job data received by the communication unit 404 and performs printing on a document sheet. The storage device 430 stores job data received by the communication unit 404. A system bus 407 exchanges data between the CPU 401, the RAM 402, the ROM 403, the communication unit 404, the printing apparatus 406, the display unit 408, the operation unit 409, and the like. The processing of the communication module 410 and the print module 420 of the printer 400 is realized by the CPU 401 reading and executing a program necessary for the processing.

Figure 4:
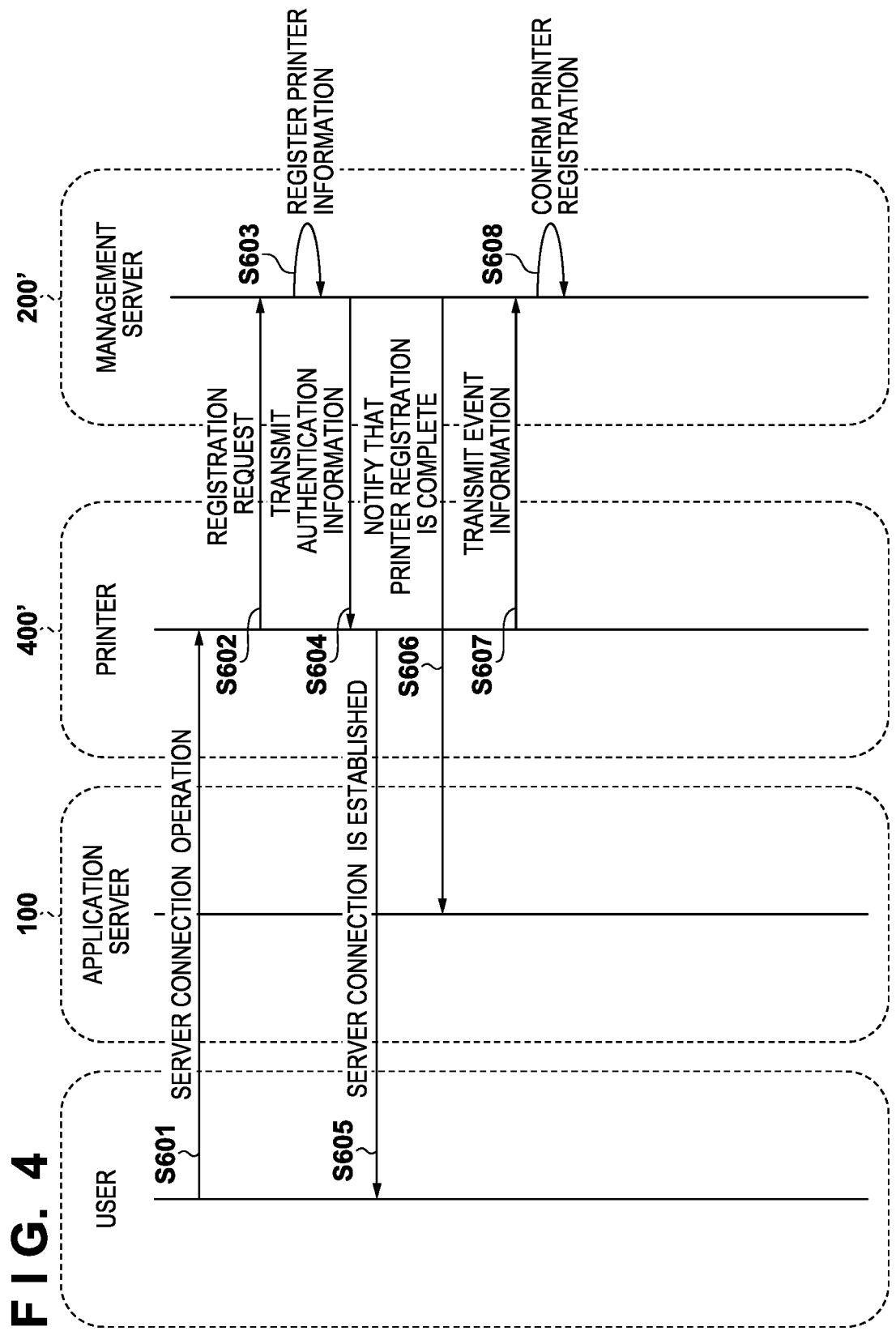
FIG. 4 is a sequence diagram illustrating processing for registering the printer 400 not having a server switching function in the management server 200.

Connection of Printer not Having Server Switching Function and Management Server (FIG. 4)

Next, processing in which in the service of the configuration of FIG. 1, a printer 400' not having the server switching function is connected to a management server and registered as a cloud printing printer will be described. An address (includes a URL or the like) of a management server 200' is registered in the printer 400' registered in the management server 200' as a communication destination for when performing cloud printing. The printer 400' obtains a job list and job data from the management server 200' and performs cloud printing. An apostrophe (') is attached to the reference numeral of the printer and the management server in the present description, because functions of the printer and the management server of FIG. 4 and the printer and the management servers of FIGS. 5 to 8 are different. In this example, the printer does not have the server switching function, and the management server also does not support the server switching function of the printer. Thus, an apostrophe (') following a reference numeral indicates that the server switching function is not supported.

FIG. 4 is a sequence diagram illustrating processing for registering the printer 400', which does not have the server switching function, in the management server 200'. A printer not having the server switching function connects only to a particular management server. In this example, assume that the management server 200' is a management server to which a printer not having the server switching function connects. Here, the management server 200' by which the printer 400' is managed is predetermined, and for example, an address, such as a URL of the management server 200', is registered as an access destination in the ROM 403.

The user performs a server connection operation with respect to the printer 400' (step or operation S601). The communication module 410 of the printer 400', after it has received the connection operation, transmits a printer registration request to the management server 200', which is registered in advance as a transmission destination (step S602). In step S602, identification information of the printer 400' and, if necessary, password information and the like, for example, are transmitted together with the printer registration request.

The management server 200', after receiving the registration request, generates information of the requesting printer 400' and authentication information, which is also referred to as a token or the like for the printer 400' to connect to the management server 200'. The generated information is associated with the requesting printer 400' and stored in the database 210 (step S603). The management server 200' transmits the generated authentication information to the printer 400' as a response to the registration request (step S604). Upon receiving the response transmitted in step S604, the printer 400' displays server registration completion to the user on the display unit 408 and notifies the user that registration is complete (step S605). The received authentication information is stored to be used when accessing the management server 200'.

The management server 200' notifies the application server 100 and the printer 400' that printer registration is complete (step S606). This makes it possible for the application server 100 to recognize that the printer 400' is registered to the management server 200' and is being managed. From step S606 onward, the printer 400' transmits information of various kinds of events (such as an error, an occurrence of an alert, and a change in the remaining amount of ink) that have occurred in the printer 400' to the management server 200' with the authentication information received in step S604 attached, each time an event occurs (step S607). The printer 400' is also capable of obtaining a job list and job data from the management server 200' and performing printing.

Upon receiving transmission of various kinds of event information or a request from the printer 400', the management server 200' confirms authentication information attached to the information or the request and processes the request as information of the printer associated with the authentication information (step S608). In this example, regarding the server connection establishment, the printer 400' notifies the user upon receiving the authentication information from the management server 200'; however, the printer 400' may notify the user immediately after transmitting the registration request in step S602 without waiting for step S604. That is, the user may be notified of the connection establishment asynchronously to registration processing with the management server 200'.

By the printer 400' being registered in the preset management server 200' with the above procedure, a cloud printing service in which the printer 400' is used can be provided.

Figure 5:
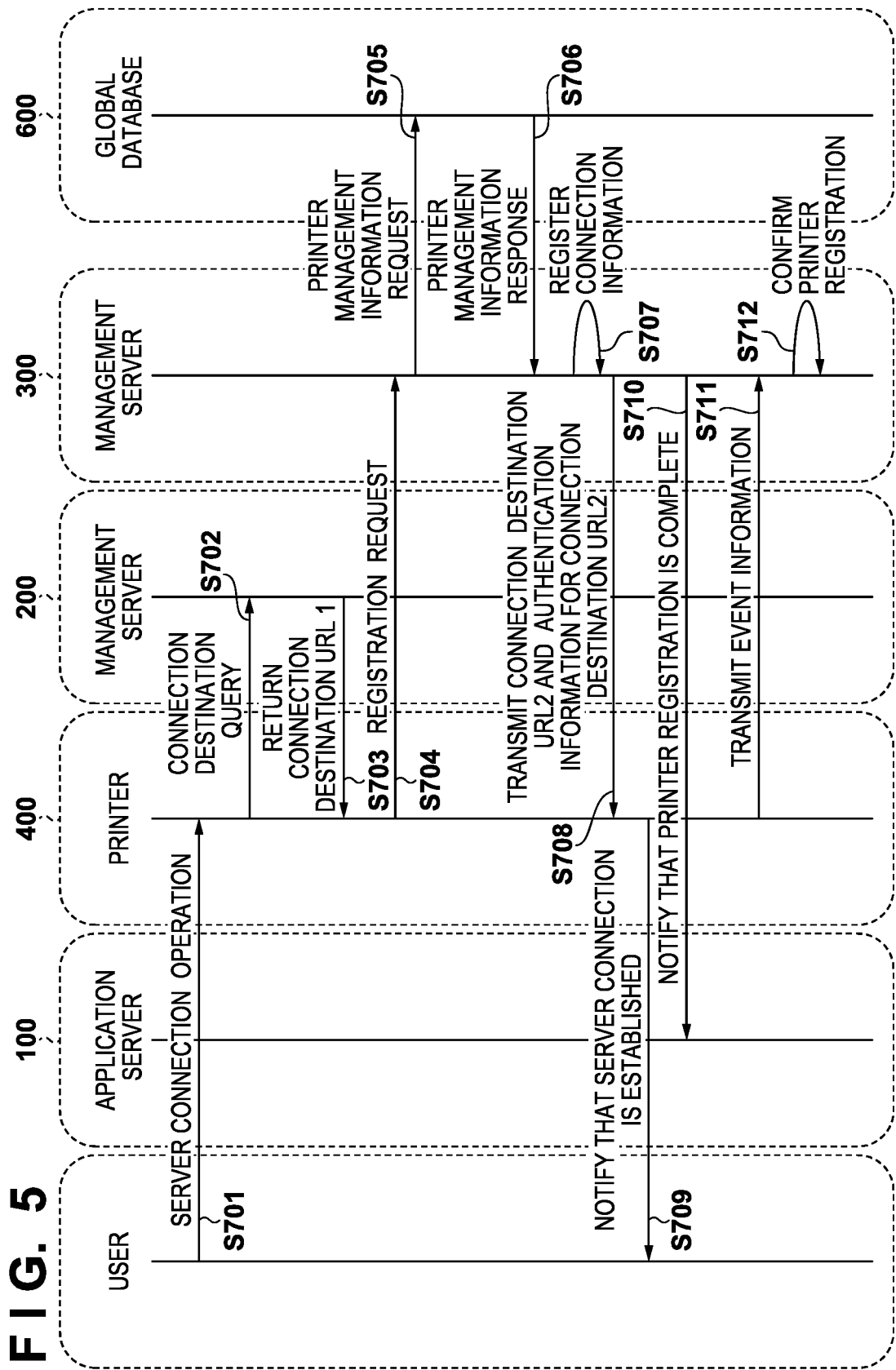
FIG. 5 is a sequence diagram illustrating processing for registering the printer 400 having the server switching function in a management server 300.

Initial Registration of Printer Having Server Switching Function in Management Server (FIG. 5)

Next, processing in which in the cloud printing service of the configuration of FIG. 1, the printer 400, which has the server switching function, is connected to and registered in the management server 300 determined as a connection destination of the printer 400 from among a plurality of management servers will be described with reference to FIG. 5. In this example, the printer 400 has the server switching function from when it is manufactured, and the management servers 200 and 300 perform operations corresponding to the printer 400 having the switching function. Whether the printer 400 has the server switching function from when it is manufactured is indicated by a firmware update flag (also called a ROM update flag), which the printer has and, if necessary, transmits with a request. In the printer 400 provided with the server switching function by a firmware update, the firmware update flag is, for example, set to on, and in the printer 400 provided with the server switching function at the time of manufacturing, the firmware update flag is set to off. In addition, the operation of the printer 400 is performed by the CPU 401, and the operation of each server is performed by the CPU 301. This is similar for FIGS. 6 to 8. In the following description, it is assumed that the firmware update flag is off. In this case, it is assumed that the printer 400 does not include a firmware update flag in a request to the server.

As will be described later, when the firmware update flag is set to on, it can be said that the server switching function is enabled, and so, the firmware update flag may be referred to as a server switching flag or server switching information. The firmware update flag may be referred to as hardware update information. The flag indicates that firmware of the printer has been updated and thus can also be referred to as a firmware update event or a ROM update event. Alternatively, the flag can be referred to as a server switching event.

The user performs a server connection operation by operating the operation unit 409 of the printer 400 (step S701). The communication module 410 of the printer 400, after having received the connection operation, transmits a connection destination query to the management server 200 (step S702). The management server 200 is registered in advance, for example, in the ROM 403 as an access destination for a query.

The control application 220 of the management server 200, after having received the query, determines a management server of the printer 400 based on printer destination information included in query information and an installation position of the printer 400 inferred from an IP address or the like of a query transmission source. The management server and the installation position of the printer may be associated in advance. In this example, a determined management server is the management server 300. The control application 220 returns a connection destination of the determined management server, such as a URL 1 (step S703). The URL 1 may be a connection destination for registering the printer 400 in the management server 300. FIG. 5 illustrates a case where the connection destination determined and returned in step S703 is the management server 300.

The communication module 410 of the printer 400, after having received the connection destination URL 1, transmits a printer registration request to the connection destination URL 1 (step S704). In this example, the URL 1 is the management server 300, and so, the printer registration request is transmitted to the management server 300. The identification information of the printer 400 is transmitted with the printer registration request.

The management server 300, after having received the registration request, transmits to the global database 600 a request for obtaining the printer information of the requesting printer 400 and the management server information of the printer 400 (step S705). The request is also referred to as a printer management information request. The printer information includes information related to the printer 400, such as identification information. The management server information includes information, such as an identifier indicating the management server of the printer 400. Information including the printer information and the management server information is referred to as printer management information. In this example, the printer 400 is not registered. Therefore, the global database 600 returns a response indicating that the printer is not registered (step S706). The response is also referred to as a printer management information request. Then, the management server 300, after having received in step S706 the response indicating that the printer 400 is not registered in the global database 600, determines whether a firmware update flag is included in the registration request of step S704. In this case, the firmware update flag is not included. In such a case, the management server 300 registers the printer management information of the printer 400 in the global database 600. FIG. 5 illustrates obtainment and registration of the printer management information collectively in steps S705 and S706.

The management server 300 also generates connection destination information, such as a URL 2, for the printer 400 to access the management server 300 and authentication information, such as a token, for the printer 400 to connect to the management server 300. The generated information is associated with the printer 400 and registered in the database 310 (step S707). The control application 320 of the management server 300 transmits the generated connection destination information, such as the connection destination URL 2, and authentication information as a response to the printer 400 (step S708). The URL 2 may be a connection destination for accessing the management server 300 when the printer 400 provides the cloud printing service. Further, in FIG. 5, both the URL 1 and the URL 2 are the management server 300 itself; however, depending on registration information of the application server 100, they may be a management server (not illustrated) other than the management server 300 or the management server 200.

Upon receiving the connection destination URL 2 and the authentication information, the printer 400 stores the information and notifies the user by displaying on the display unit 408 that connection is established (step S709). The management server 300 notifies the application server 100 that the registration of the printer 400 is complete (step S710).

This makes it possible for the application server 100 to recognize with which of a plurality of management servers the printer 400 is connected. Thereafter, the printer 400 transmits information of various kinds of events (such as an error, an occurrence of an alert, and a change in the remaining amount of ink) that have occurred in the printer 400 to the management server 300 with the authentication information received in step S708 attached (step S711). When the management server 300 receives transmission of various kinds of event information or a request from the printer 400, the management server 300 confirms the attached authentication information and processes the request as information of the printer corresponding to the authentication information (step S712).

A client can obtain, from the management server 300, information indicating that the printer 400 is included as a printer for the cloud printing service, specify the printer 400, and instruct cloud printing. The printer 400 can obtain, from the management server 300, job data to be printed on the printer 400 and print the job data.

In the above-described example, a method in which the printer 400 queries the management server 200 in the determination of the connection destination of the printer 400 is described; however, a configuration may be such that the management server 300 is queried. Alternatively, a configuration may be such that, for example, a server dedicated to processing only connection destination queries is installed and that server is queried.

With such a procedure, a printer having the server switching function can be registered in a management server determined for that printer. Once registered, the printer can perform cloud printing by communicating with that management server.

Figure 6:
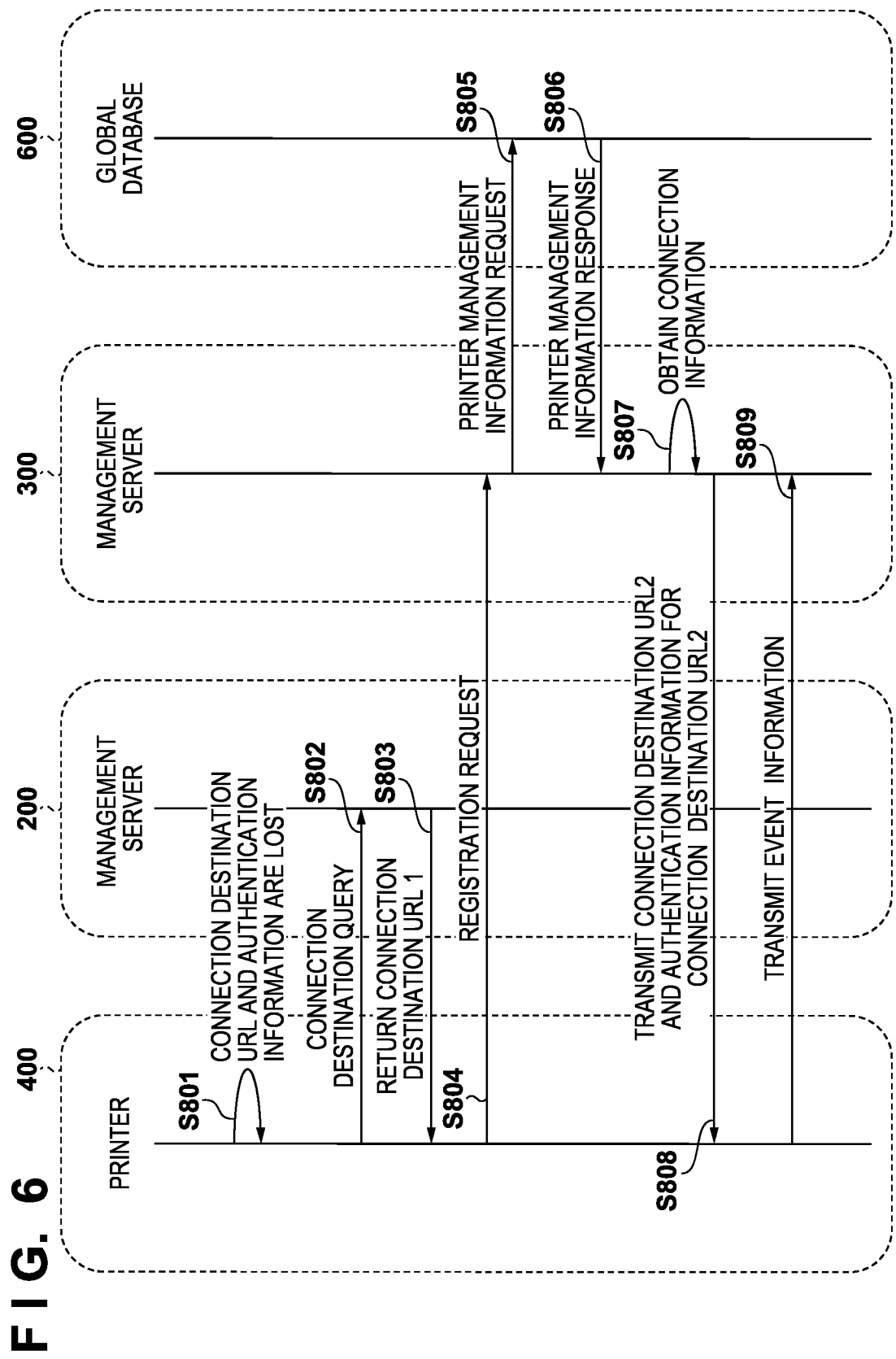
FIG. 6 is a sequence diagram in which the printer 400 registered in the management server 300 re-obtains connection destination information.

Re-Obtainment of Management Server Information by Registered Printer Having Server Switching Function (FIG. 6)

Next, a flow in which in the service of the configuration of FIG. 1, the connection destination URLs 1 and 2 and the authentication information are reobtained when the printer 400 and the management server 300, which is a management server of that printer, are already registered in the global database 600 will be described with reference to FIG. 6. In this example, the printer 400 has the server switching function from when it is manufactured, and the management servers 200 and 300 perform operations corresponding to the printer 400 having the switching function. Whether the printer 400 has the server switching function from when it is manufactured is indicated by a firmware update flag, which is transmitted, as necessary, with a request. In the following description, it is assumed that the firmware update flag is off. In this case, it is assumed that the printer 400 does not include a firmware update flag in a request to the server. In addition, the operation of the printer 400 is performed by the CPU 401, and the operation of each server is performed by the CPU 301.

If a URL (connection destination information) and authentication information of a management server of the printer 400 are stored in a volatile memory, the stored information may be lost, for example, when the power of the printer 400 is turned off and then turned on again. Alternatively, information stored in a hard disk and the like may be lost due to damage. A procedure of FIG. 6 is performed, for example, when a URL and authentication information of a connection destination management server determined by a management server with the procedure of FIG. 5 are lost from the printer 400.

Even when at least either a URL or authentication information of the connection destination management server in the printer 400 is lost, the printer 400 communicates with the management server 200 and the management server 300 with an interface similar to that described in FIG. 5.

When connection destination information or authentication information is lost or damaged, the printer 400 determines whether a connection destination needs to be queried again (step S801). It is determined whether information is lost or damaged when connection destination information and authentication information are referenced, such as when a self-diagnostic program is periodically run and when the user attempts to obtain a job with the printer 400.

The communication module 410 of the printer 400 transmits a connection destination server query to the management server 200 (step S802). Address information of the management server 200 may be protected from loss or damage by being stored in a non-volatile medium, such as a flash memory or a ROM.

The control application 220 of the management server 200, after having received the query, determines a management server of the printer 400 based on printer destination information included in query information and an installation position of the printer 400 inferred from an Internet Protocol (IP) address or the like of a query transmission source. The management server and the installation position of the printer may be associated in advance. The control application 220 returns a connection destination of the determined management server, such as the URL 1 (step S803). The URL 1 may be a connection destination for registering the printer 400 in the management server 300. Similarly to FIG. 5, FIG. 6 illustrates a case where the connection destination determined and returned is the management server 300.

The communication module 410 of the printer 400, after having received the connection destination URL 1, transmits a printer registration request to the URL 1, that is, the management server 300 (step S804).

The management server 300, after having received the registration request, transmits to the global database 600 a printer management information request for obtaining the printer information of the requesting printer 400 and the management server information of the printer 400 (step S805). In this case, the printer 400 is already registered, and so, the global database 600 returns registered printer information and management server information as a printer management information response (step S806). The management server 300, after having received the response, obtains connection destination information of the printer 400 and authentication information from the database 310 (step S807). The obtained management server information includes the authentication information and the connection destination URL 2. The management server 300 transmits the authentication information and the connection destination URL 2 obtained from the database 310 to the printer 400 as a response to the registration request (step S808).

Thereafter, the printer 400 can once again transmit information of various kinds of events (such as an error, an occurrence of an alert, and a change in the remaining amount of ink) that have occurred in the printer 400 to the management server 300 with the authentication information received in step S808 attached (step S809).

In the above example, a method in which the printer 400 issues a registration request triggered by loss or damage of the connection destination URL and the authentication information, and then reobtains the management server information in response to the registration request has been described. However, a configuration may be such that information is transmitted without detection of loss or damage, and when a result indicates failure, a connection destination is queried, triggered by the failure. Alternatively, a configuration may be such that before an attempt is made to transmit information, it is confirmed that authentication information is present in the printer 400. Alternatively, a configuration may be such that whenever the printer 400 is in a particular state, the printer 400 performs a connection destination query of step S802 with respect to the management server 200, a dedicated server of that type, or the like as part of the initialization processing. By performing such processing described in FIG. 6, even at the time of reobtainment, a connection destination URL and authentication information necessary for connection can be passed to the printer 400 with an interface similar to that described in FIG. 5.

Figure 7:
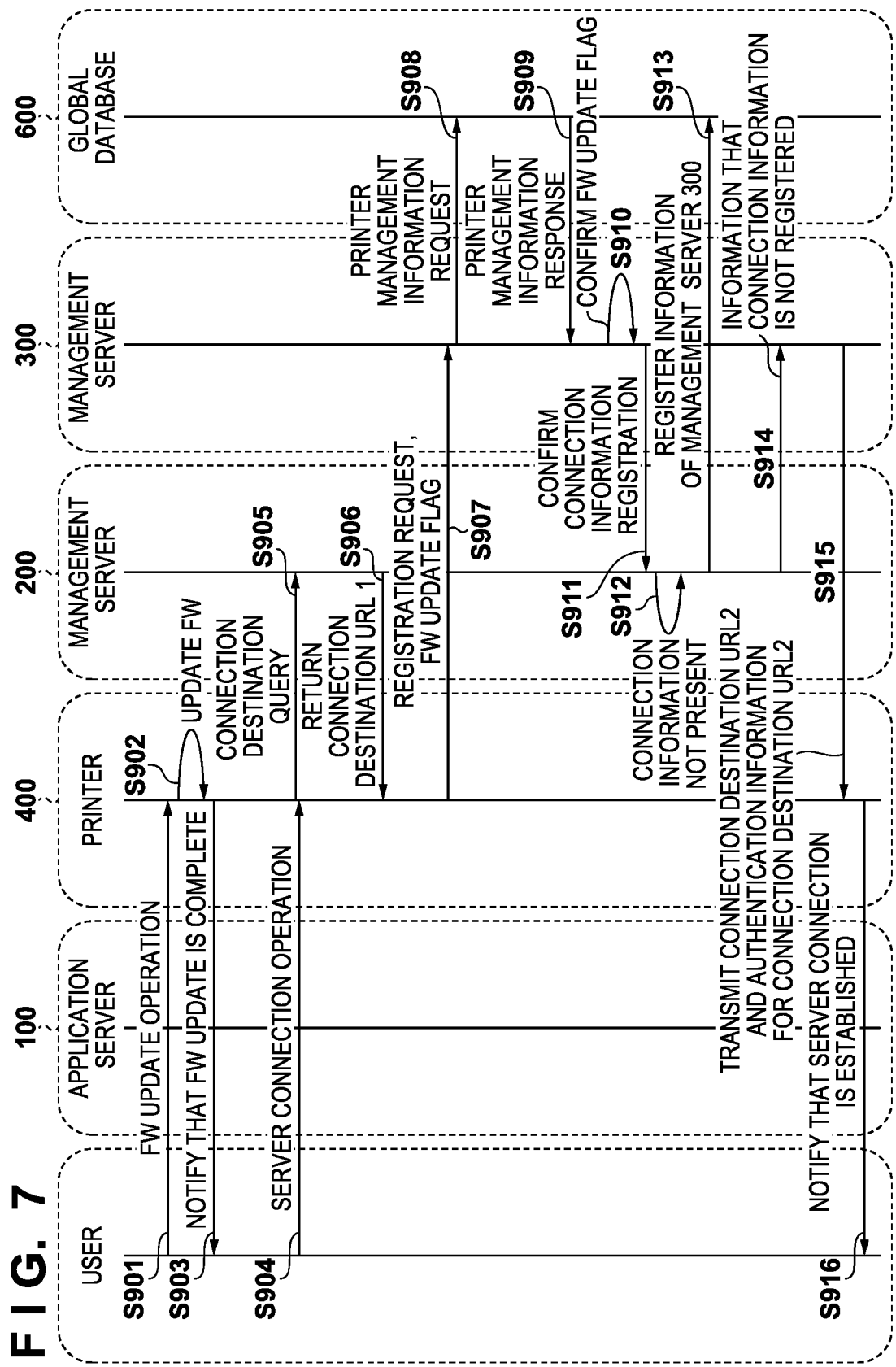
FIG. 7 is a sequence diagram illustrating an operation for when the printer 400 is connected to a management server for the first time in a case where it has never been connected to a management server and where the printer 400 has obtained the server switching function.

Registration in Management Server by Printer to which Server Switching Function has been Added (FIG. 7)

Next, processing by which the printer 400, after having obtained the server switching function by a firmware update (also referred to as a ROM update), connects with the management server 300 and makes a registration request will be described with reference to FIG. 7. This procedure is also realized in the cloud printing service of the configuration of FIG. 1. In this procedure, the printer 400 does not have the server switching function at the time of manufacturing, and the server switching function is added by the firmware update. The printer 400 is not registered in the cloud printing system until the firmware update. FIG. 7 illustrates a procedure for registration in such a case. In the drawing and in the following text, firmware is denoted as FW. When querying a connection destination management server, the printer 400 informs the management server 300 that it is a printer that has additionally obtained the server switching function by using a firmware updated flag. The printer 400 is not registered, and so there is no printer information in the management server 200, and similarly to a printer having a function for switching connection destinations from when it is manufactured described in FIG. 5, the printer 400 is registered by connecting to the management server 300.

The user performs an FW update operation with respect to the printer 400 (step S901). The printer 400 performs a firmware update in response to the firmware update operation (step S902). At this time, pre-update firmware does not have a function for switching registered management servers, and that function is added to post-update firmware. The printer 400 notifies a user of firmware update completion by, for example, displaying firmware update completion to the user using the display unit 408 (step S903).

After the firmware update is complete, the user performs a server connection operation with respect to the printer 400 (step S904). The communication module 410 of the printer 400 queries the management server 200 for a connection destination (step S905). The management server 200, which is a destination of the connection destination query, is predetermined, and that destination is stored in the printer 400. This destination may be stored, for example, with the firmware update or before the firmware update.

The control application 220 of the management server 200, after having received the query, determines a management server of the printer 400 based on printer destination information included in query information and an installation position of the printer 400 inferred from an IP address or the like of a query request transmission source. The connection destination URL 1 of the determined management server is returned (step S906). FIG. 7 illustrates a case where the determined management server is the management server 300. The communication module 410 of the printer 400, after having received the connection destination URL 1, transmits a printer registration request and a firmware update flag to the management server 300 (step S907).

The management server 300, after having received the registration request, transmits to the global database 600 a printer management information request for obtaining the printer information and the management server information of the requesting printer 400 (step S908). This request also includes information related to the printer 400, such as identification information. In this example, the printer 400 is not registered. If it is determined that the printer 400 is not registered, the global database 600 returns a printer management information response indicating that the printer 400 is not registered (step S909). The management server 300, after having received that response, determines whether a firmware update flag is included in the registration request (step S910). If the management server 300 determines that a firmware update flag is included, the management server 300 transmits a request for confirming (or obtaining) whether the connection destination information of the printer 400 and the authentication information (collectively referred to as the connection information) are held to the management server 200 (step S911). This is because the printer 400 may have been connected to the management server 200 prior to the firmware update. The management server to which the printer 400 may have been connected prior to the firmware update can be identified based on, for example, the shipping destination of the printer 400.

The management server 200, after having received the request, determines whether the connection information of the printer 400 is stored in the management server 200 (step S912). In this example, corresponding information is not registered. In such a case, the management server 200 registers in the global database 600 the management server information indicating that the management server 300 is the management server of the printer 400 (step S913). The management server of the printer 400 is determined by the management server 200, and so, in step S913, the printer information and the management server information of the printer 400 may be registered based on that determination. In addition, the management server 200 returns to the management server 300 a determination result (e.g., there is no corresponding registration information in this case) in the management server 200 (step S914). The management server 300 returns to the printer 400 the authentication information and the connection destination URL 2 of the management server 300 registered as the management server of the printer 400 (step S915).

Upon receiving the connection destination URL 2 and the authentication information of the connection destination URL 2 from the management server 300, the printer 400 notifies a user that the server connection is established by displaying it on the display unit 408 to the user (step S916).

In this example, the printer 400 in which firmware has been updated can thus be newly registered to the cloud printing system. Then, the management server determined as the management server of the printer 400 is registered in the global database, and the connection information is registered in the determined management server 300. The connection information is also stored in the printer 400 and is referenced for the cloud printing service in which the printer 400 is used.

Figure 8:
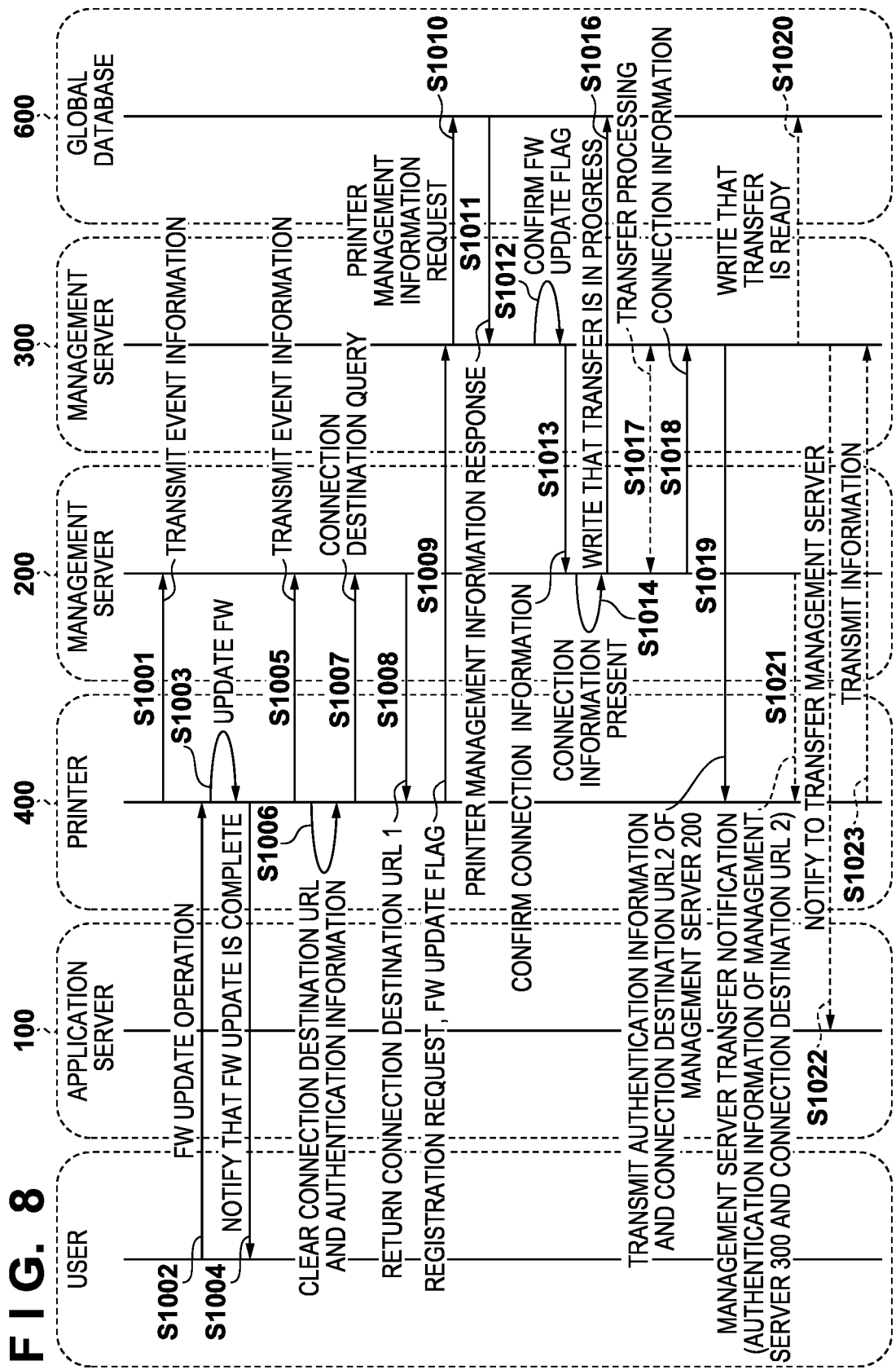
FIG. 8 is a sequence diagram illustrating processing in which the printer 400, after obtaining the server switching function, connects to a management server and transfers, to the management server 300, printer information present in the management server 200 to which the printer 400 was connected before a ROM update.

Switching of Management Servers by Printer to which Server Switching Function has been Added (FIG. 8)

In the procedure of FIG. 4, the printer 400 is registered to the management server 200 until the server switching function is obtained by a firmware update and performs printing with the cloud printing service under the management of the management server 200. That is, event information is transmitted to the management server 200, and print job data is obtained from the management server 200 and printed. FIG. 8 is a diagram of a sequence from the server switching function being added to the printer 400 registered in the management server 200 according to the procedure of FIG. 4 by a firmware update until a transmission destination of event information being switched over to the management server 300, which is a new connection destination. That is, it illustrates a method of switching servers. In this example, a management server determined from the shipping destination or the like of the printer 400 is changed from the management server 200 to the management server 300. However, since the printer 400 has been registered to the management server 200, even if the new management server 300 is installed, the printer 400 is neither managed by nor communicates with the management server 300. In an example of FIG. 8, even in such a case, the new management server 300 can be registered as the management server of the cloud printing service. When querying a connection destination management server, the printer 400 informs the management server side that it is a printer that has obtained the server switching function by a firmware update by using a firmware update flag. Thus, the connection information of the printer 400 stored in the management server 200 is transferred to the management server 300.

The printer 400 transmits event information to the management server 200 using the connection destination URL and the authentication information obtained by the processing described in FIG. 4 (step S1001). The user performs a firmware update operation with respect to the printer 400 (step S1002). The printer 400 performs a firmware update in response to the firmware update operation (step S1003). The printer 400 informs the user that the ROM update is complete by displaying so on the display unit 408 (step S1004). Even after step S1004, the printer 400 transmits event information to the management server 200 according to the stored connection information (step S1005). In addition, the printer 400 obtains job data from the management server 200 and prints the job data.

After step S1005, the connection information including the connection destination URL and the authentication information present in the printer 400 is cleared (step S1006). The user may intentionally cause the information to be cleared. For example, a configuration may be such that a user interface for server switching is provided by the updated firmware, and the connection destination URL and the authentication information are cleared as a result of operation on the user interface. If clearing is possible by a power-off, a power-off/on operation may be performed. The printer 400 queries the management server 200 for a connection destination, triggered by the information being cleared (step S1007). The management server 200, which is a destination of the connection destination query, is predetermined, and that destination is stored in the printer 400. This destination may be stored, for example, with the firmware update or from before the firmware update.

The control application 220 of the management server 200, after having received the query, determines a management server of the printer 400 based on printer destination information included in query information and an installation position of the printer 400 inferred from an IP address or the like of a query request transmission source. The connection destination URL 1 of the determined management server is returned (step S1008). FIG. 8 illustrates a case where the determined connection destination is the management server 300. The communication module 410 of the printer 400, after having received the connection destination URL 1, transmits a printer registration request and a firmware update flag to the management server 300 (step S1009).

The control application 320 in the management server 300, after having received the registration request, transmits to the global database 600 a request for obtaining the printer information and the management server information of the requesting printer 400 (step S1010). This request also includes information related to the printer 400, such as identification information. As is evident from when FIG. 4 is referenced, in the procedure of FIG. 4, the global database 600 does not appear, and so, the printer 400 is not registered. If it is determined that the printer 400 is not registered, the global database 600 returns a response indicating that the printer 400 is not registered (step S1011).

The control application 320 of the management server 300, after having received that response, determines whether the registration request transmitted in step S1009 includes a firmware update flag (step S1012). When the control application 320 of the management server 300 determines that there is a firmware update flag, the control application 320 transmits to the management server 200 a request for confirming (or obtaining) whether the connection information of the printer 400 prior to the firmware update is stored (step S1013). This is because the printer 400 may have been connected to the management server 200 prior to the firmware update. The management server to which the printer 400 may have been connected prior to the firmware update can be identified based on, for example, the shipping destination of the printer 400.

The control application 220 of the management server 200, after having received the request, determines whether the connection information of the printer 400 is stored in the database 210 (step S1014). In this example, corresponding information is stored. When the control application 220 of the management server 200 determines that the connection information of the printer 400 is stored, the control application 220 writes information (transfer-in-progress information) indicating that the global database 600 is being transferred (step S1016). When the control application 220 of the management server 200 writes in step S1016 that transfer is in progress, the control application 220 communicates with the control application 320 in the management server 300 and performs (step S1017) processing for transferring information related to the printer 400 asynchronously to the flow that is indicated by a solid line in FIG. 8. The asynchronously-performed processing is illustrated by a dotted line in the drawing. The transfer processing includes, for example, duplication of information from the management server 200 to the management server 300. Information to be duplicated may include, for example, a job list and job data of print jobs to be printed in the printer 400 and their print setting information. The control application 220 of the management server 200 returns the connection information of the printer 400 stored in the database 210 of the management server 200 to the control application 320 of the management server 300 (step S1018).

When the control application 320 of the management server 300 receives the response of step S1018, the control application 320 returns (step S1019) to the printer 400 the received connection information (authentication information and connection destination URL 2) of the printer 400. This connection information includes the authentication information and the connection destination URL 2 for the management server 200. Furthermore, when the transfer processing has proceeded to a predetermined step or operation, the management server 300 updates a "transfer-in-progress" state of the information related to the printer, which has been stored in the global database 600 in step S1016, to a "transfer-ready" state (step S1020). With transfer ready being written, the printer management information may be registered such that the management server that manages the printer 400 is the new management server 300.

Here, the predetermined step refers to a step or an operation in which even if a request is made to the management server 300 which is a transfer destination of the printer 400, a difference between the information stored in the management server 200 and the management server 300 will not result in abnormal processing. For example, if servers are switched before the start of duplication of unprocessed data (e.g., job data that the printer 400 has yet to obtain), an attempt may be made to obtain that unprocessed data from a post-switch server. In this case, the data to be obtained is not on the post-switch server, and the request for obtaining data results in an error. To prevent these kinds of situations, a transition to the transfer-ready state may be made, for example, after the start of duplication of unprocessed data (e.g., unobtained job data and print setting information) from the management server 200 to the management server 300. This predetermined step can be said to be a timing at which the transfer has become ready. It can be recognized that the transfer is ready not only by the management server 300 but also by the management server 200. Therefore, step S1020 may be performed by the management server 200.

When the transfer is ready, after step S1020, the management server 200 transmits a management server transfer notification to the printer 400. The authentication information and the connection destination URL 2 (i.e., the connection information) of the management server 300 are transmitted with the notification (step S1021). With this, it is notified that the management server of the printer 400 has been transferred from the management server 200 to the management server 300. The connection information of the management server 300 may be obtained by the management server 200 making a request to the management server 300. At this time, in response to the request, the management server 300 may generate and store the connection information. That is, the printer 400 may be registered at this time. In addition, the management server 200, after having transmitted the connection information of the management server 300 to the printer 400, may clear registered information of the printer 400, such as the connection information.

After the transfer is ready and the management server 200 transmits a transfer notification to the printer 400 in step S1021, the management server 300 transmits a transfer-ready notification to the application server 100 (step S1022). With this, it is notified that the management server of the printer 400 has been transferred from the management server 200 to the management server 300. After step S1022, the printer 400 transmits event information and the like that have so far been transmitted to the management server 200 to the management server 300 (step S1023).

Steps S1020 and S1022 are executed by the management server 300, and step S1021 is executed by the management server 200. According to the above description, these steps are performed in order of step S1020, step S1021, and step S1022, and so, the management server 200, which executes step S1021, needs to know that step S1020 has been executed by the management server 300. At this time, the management server 200 also needs to know the connection information of the management server 300. The management server 300, which executes step S1022, also needs to know that step S1021 has been executed by the management server 200. Therefore, although not clearly indicated in FIG. 8, the management server 300, after having executed step S1020, may notify the management server 200 that step S1020 has been executed. Similarly, the management server 200, after having executed step S1021, may notify the management server 300 that step S1021 has been executed.

Further, in step S1022 of FIG. 8, the management server 300 notifies the printer 400 of the management server transfer; however, a case where this notification fails due to network/protocol failure is conceivable. At that time, the management server 200 and the printer 400 communicates until a connection destination query of step S1007 is received from the printer 400 again, and the post-transfer information is passed by transmission of the authentication information and the connection destination URL 2 of the management server 200 in step S1018. Further, although the transmission source of steps S1019 and S1022 of FIG. 8 is the management server 300, which is the transfer destination, the transmission may be performed from the management server 200, which is the transfer source.

In addition, in step S1009, the printer 400 transmits a firmware update flag to the management server 300, and in step S1012, the firmware update flag is confirmed. In contrast to this, the firmware update flag need not be present. In such cases, a configuration may be taken so as to skip the processing of step S1012 and always perform the processing of step S1013. At that time, the processing of step S1013 needs to be performed even though step S1013 would be unnecessary as in FIG. 5 if the printer has the server switching function at the time of manufacturing. However, there is an advantage that processing can be standardized so long as the printer has the server switching function, regardless of whether it is from the time of manufacturing or it has been obtained by a firmware update. Further, such a configuration makes it possible for the printer 400 having the server switching function from the time of manufacturing to transfer the management server without setting a firmware update flag.

In addition, as described in the procedure of FIG. 5, a printer that has been provided with the server switching function from the time of manufacturing is incapable of handling transferring of the management server as is. However, by setting a firmware update flag to on, the procedure described in FIG. 8 is adopted, and thus, the management servers can be switched.

As described above, procedures for when management server transfer occurs have been described with respect to the cloud printing system as a whole. Here, a printer having the server switching function, a global database, and management servers will be described anew.

Server Switching Function of Printer

A printer having the server switching function transmits a connection query to a predetermined management server (in the above examples, the management server 200) according to a server connection operation by the user. In response to this connection query, the predetermined server determines a management server of the querying printer and returns connection destination information (such as a URL), which is an address of the management server, to the printer. The printer, after having received the connection destination, transmits a registration request to the received connection destination. In this way, as compared to a printer that does not have the server switching function, the printer that has that function first executes processing for obtaining information of a registration request transmission destination from a specific server. This step makes it possible for the management server corresponding to the printer to not be fixed, and for the cloud printing service provider side to determine the server, as appropriate, and change the server.

Global Database

By a global database being provided, even when a plurality of management servers manage printers, for example, for each region, it is possible to manage printer registration statuses across the entirety of a plurality of management servers. The registration statuses allow centralized management of presence or absence of registration or the like as well as which printer is registered in which management server.

Processing of Connection Request by Management Server 300

In the following, the processing of the management server 300 after it has received a registration request will be described again with reference to FIGS. 9 and 10. The processing of these drawings is executed by the CPU 301 of the management server 300.

Figure 9:
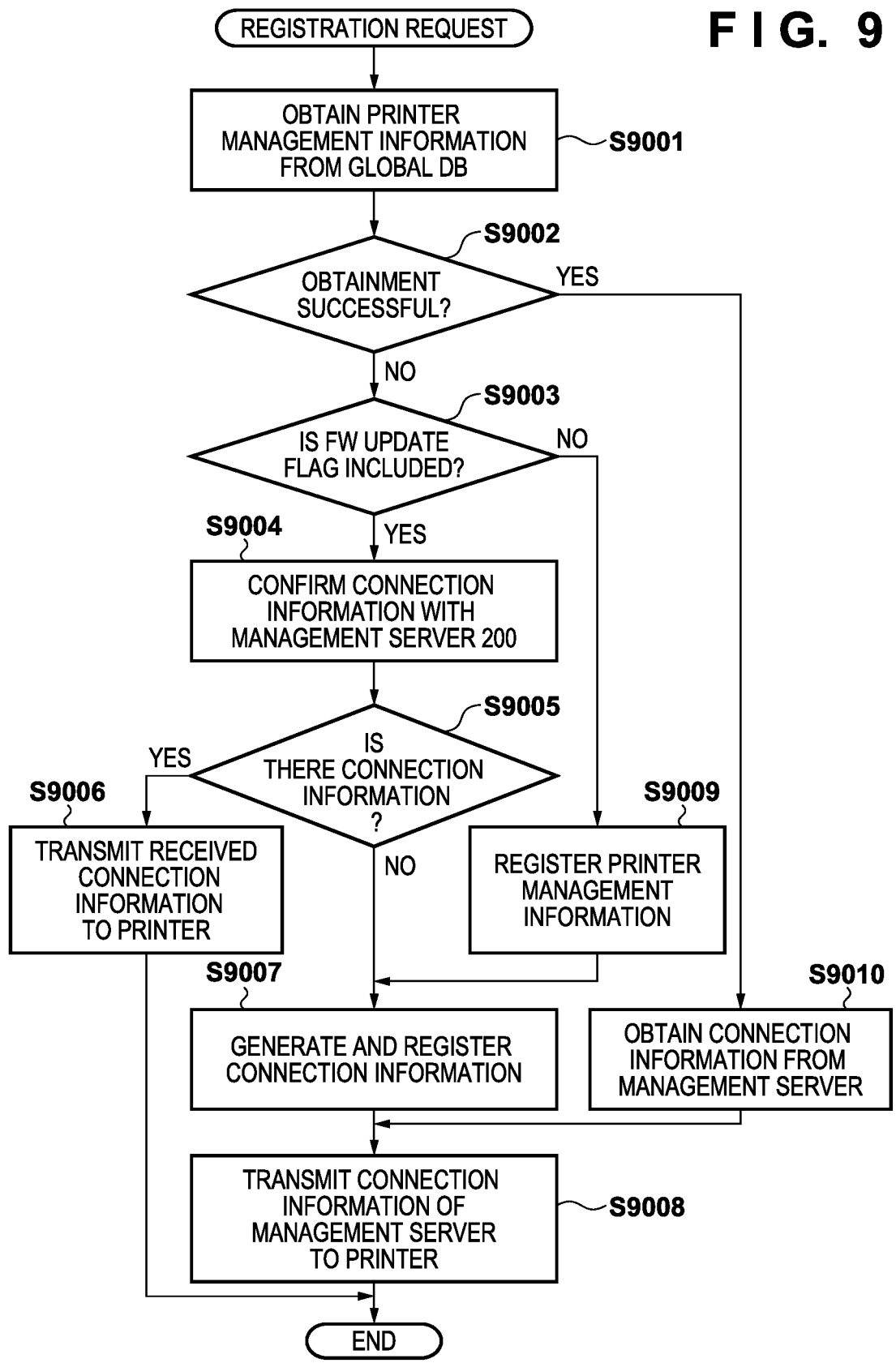
FIG. 9 is a flowchart of processing of the management server 300 after it has received a registration request.

The management server 300, after having received a registration request, performs the processing of FIG. 9. First, an attempt to obtain printer management information from the global database 600 is made (step S9001). It is determined whether obtainment is successful (step S9002) and, if successful, it is determined whether a firmware update flag is included in the request (step S9003). When a firmware update flag is always included and is set to either "on" or "off", "included" includes a state in which the flag is set to on.

If a firmware update flag is included, a request for confirming presence or absence of connection information (URL and authentication information of the management server) of the printer, which is the source of the registration request, is issued to the management server 200 (step S9004). This request may be a request for obtaining connection information. If there is corresponding connection information for the request, that information is returned; otherwise, something to that effect is returned. Then, presence or absence of connection information is determined by the response being tested (step S9005). If the response contains connection information, the received connection information is transmitted to the printer, which is the source of the registration request (step S9006). The procedure until step S9006 is equivalent to the case of FIG. 8.

Meanwhile, if connection information is not included, connection information including an address (e.g. URL) and authentication information (e.g. token) of the management server is generated, stored, and managed by that management server (step S9007). Then, that connection information is transmitted to the printer, which is the source of the registration request (step S9008). The procedure from after step S9005 until step S9008 is equivalent to the case of FIG. 7.

If it is determined in step S9003 that a firmware update flag is not included in the registration request, printer management information including information of the printer, which is the source of the registration request, and management server information of the management server to which the registration request has been made is generated. Then, that information is registered in the global database 600 (step S9009). Thereafter, the processing from step S9007 onward is executed. The procedure branching from step S9003 to step S9009 is equivalent to the case of FIG. 5.

When it is determined in step S9002 that printer management information has been successfully obtained, connection information that should be stored in the management server is obtained (step S9010) from that management server, the management server being that of the printer, which is the source of the registration request, and included in the printer management information. Then, in step S9008, that information is transmitted to the printer, which is the source of the registration request.

FIG. 10 illustrates a procedure of the transfer processing that corresponds to steps S1017 and S1020 to S1022 of FIG. 8 and which is executed asynchronously to the processing of FIG. 9. The transfer processing is started with the management server 200 (step S10001). The transfer processing is started by the management server 200 after the determination result of step S1014 and the processing of step S1016 corresponding thereto. This transfer processing includes the processing for duplicating information related to the printer, which is the transmission source of the registration request, from a pre-switch management server to a post-switch management server. Assume that the transfer processing including this duplication continues to be performed until transferring of target data is complete.

Until the transferring of data advances and reaches the predetermined step described in FIG. 8 is awaited (step S10002), and when the step is reached, transfer ready is written into the global database 600 (step S1003). The connection information of a post-switch management server is transmitted to the printer, which is the source of the registration request (step S10004). Although this step is performed by the management server 200 in FIG. 8, the description thereof assumes that it may be performed by the management server 300, and in FIG. 10, it is assumed that this step is performed by the management server 300. In this case, the connection information for connecting to the management server may be generated and transmitted in step S10004.

Finally, a management server transfer notification is transmitted also to the application server 100 (step S10005). This notification may include, for example, printer information of the printer for which the management servers have been switched and information of the new management server.

Effects of Present Embodiment

According to the above configurations and procedures, the cloud printing system can transfer data related to a printer between management servers necessary for management server switching without interrupting provision of the cloud printing service. Furthermore, if the above-described procedures are applied to a client apparatus that is not a printer, transfer of data for that client apparatus can similarly be performed while continuing a service.

In addition, even if not all of the data on the printer has been transferred, so long as the transferring has advanced to a predetermined step, it is possible to transfer to a new management server, and thus, it is possible to swiftly advance management server transfer.

Furthermore, so long as a printer has the server switching function, a management server, which is a switchover destination, can be determined and changed by a system administrator without the firmware of the printer being changed.

In addition, the registration statuses of all of the printers registered in management servers can be managed in a centralized manner by a global database, and so it is possible to prevent omissions in management attributable to management server transfer.

Furthermore, a printer and its management server are associated in a centralized manner by a particular server, and so, it becomes possible to achieve simplification of management work and increased efficiency.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-109064, filed Jul. 6, 2022, which is hereby incorporated by reference herein in its entirety.

What is claimed is:

1. A network system including a device, a first server, and a second server,
the device transmitting operation information to a connected server,
the second server comprising:
at least one second processor, wherein at least one second program executed by the at least one second processor causes the second server to:
transmit, to the first server, a request for first connection information for the device to connect to the first server based on reception of a registration request accompanying a firmware update from the device, and
the first server comprising:
at least one first processor, wherein at least one first program executed by the at least one first processor causes the first server to:
after a reception of the request for the first connection information, start transferring, to the second server, data related to the device, and
transmit to the second server the first connection information in response to the request for the first connection information,
wherein the at least one second program causes the second server to further transmit to the device the first connection information received from the first server, and
wherein when the transferring of data unobtained by the device included in the data related to the device is started, second connection information for connecting to the second server is transmitted from either the first server or the second server to the device.

2. The network system according to claim 1, wherein the device queries a predetermined server for a connection destination and, in a case where the second server is returned as the connection destination, transmits the registration request to the second server.

3. The network system according to claim 1, wherein in a case where the first connection information that had been stored is lost, the device transmits the registration request.

4. The network system according to claim 1, wherein the data related to the device and to be transferred includes data to be obtained by the device.

5. The network system according to claim 1, wherein the registration request is received from the device when the firmware update of the device has occurred.

6. The network system according to claim 1, wherein the first connection information includes authentication information for connecting to the first server, and the second connection information includes authentication information for connecting to the second server.

7. The network system according to claim 6, wherein the first connection information includes an address of the first server, and the second connection information includes an address of the second server.

8. The network system according to claim 1, wherein the network system further includes an application server configured to provide data to the first server or the second server, and after the second connection information is transmitted to the device, the second server further notifies the application server that the device is registered in the second server.

9. The network system according to claim 1, wherein when the transferring of the data unobtained by the device included in the data related to the device is started, the first server transmits to the device the second connection information received from the second server.

10. The network system according to claim 1, wherein when the transferring of the data unobtained by the device included in the data related to the device is started, the second server generates the second connection information and transmits the second connection information to the device.

11. A method of switching servers in a network system including a device, a first server, and a second server, the method comprising:

the device transmitting operation information to a connected server, the second server transmitting, to the first server, a request for obtaining first connection information for the device to connect to the first server based on reception of a registration request accompanying a firmware update from the device, and the first server after a reception of the request for the first connection information, starting transferring of data related to the device to the second server, and transmitting to the second server the first connection information in response to the request for the first connection information, wherein the second server transmits to the device the first connection information received from the first server, and wherein when the transferring of data unobtained by the device included in the data related to the device is started, second connection information for connecting to the second server is transmitted from either the first server or the second server to the device.

* * * * *